United States Patent

Tamura et al.

[11] Patent Number: 5,920,531
[45] Date of Patent: Jul. 6, 1999

[54] OPTICAL DISK DRIVE APPARATUS AND LINEAR VELOCITY CALCULATING METHOD THEREFOR

[75] Inventors: Tomomichi Tamura, Fukuoka; Kiyoyuki Suenaga, Kasuga, both of Japan

[73] Assignee: Matsushita Electric Industrial Co., Ltd., Osaka, Japan

[21] Appl. No.: 08/867,850

[22] Filed: Jun. 3, 1997

[30] Foreign Application Priority Data

Aug. 30, 1996 [JP] Japan .................................. 8-230025

[51] Int. Cl.⁶ ...................................................... G11B 7/00
[52] U.S. Cl. ................................................. 369/50; 369/48
[58] Field of Search ..................................... 369/50, 44.28, 369/44.27, 47, 48, 54, 58, 32; 360/73.03, 73.04, 78.04, 77.02, 77.03

[56] References Cited

U.S. PATENT DOCUMENTS 5,680,023  10/1997  Komaki .............................. 360/73.04

FOREIGN PATENT DOCUMENTS 5242493    9/1993  Japan .
A8221917   8/1996  Japan .

*Primary Examiner*—Thang V. Tran
*Attorney, Agent, or Firm*—Stevens, Davis, Miller & Mosher, L.L.P.

[57] ABSTRACT

An apparatus for reproducing data from the optical disk at a constant linear velocity includes a specified rotation speed detection module which decides whether or not the optical disk is rotating at a specified rotation speed. A linear velocity calculation module arithmetically determines the linear velocity by measuring a time taken for a complete rotation of the optical disk at a start position of a data area on the optical disk when the optical disk is detected as rotating at a specified rotation speed.

10 Claims, 8 Drawing Sheets

OPTICAL DISK DRIVE APPARATUS AND LINEAR VELOCITY CALCULATING METHOD THEREFOR

BACKGROUND OF THE INVENTION

1. Field of the Invention

The present invention relates to an optical disk drive apparatus for reproducing data in a constant linear velocity made and a method of arithmetically determining or calculating the linear velocity of the disk.

2. Description of Related Art

As is well known in the art, optical disk recording midia are capable of recording or storing a large amount of data with a high recording density. In recent years, many-sided activities have been made in efforts to develop the optical disk of enhanced performance and find practical applications thereof. As a typical one of the applications of the optical disk, there may be mentioned a compact-disk read-only memory device known as the CD-ROM drive and developed on the basis of the optical disk which is intrinsically designed for reproduction of pieces of music and known also as the CD for short.

With the compact-disk read-only memory (hereinafter also referred to simply as the CD-ROM), a large-capacity recording medium having a recording or storage capacity of about 650 mega-bytes (MB) can be realized by using an optical disk of 12 cm in diameter and resorting to a constant-linear-velocity reproduction mode. Furthermore, a write-once optical disk known a recordable compact disk or CD-R has also been developed in addition to optical disks designed only for the reproduction.

To provide better understanding of the technical background of the invention, description will first be made of a conventional optical disk drive apparatus designed for reproducing data at a constant linear velocity by taking as an example a CD-ROM drive designed for reproducing data at a constant linear velocity. FIG. 10 of the accompanying drawings is a block diagram showing schematically a structure of a conventional optical disk drive known heretofore. In the figure, reference numeral 1 denotes an optical disk having data recorded at a constant linear velocity, numeral 2 denotes an optical pickup for reading out the data recorded on the optical disk 1, numeral 3 denotes a servo controller for controlling the optical pickup 2 so that it follows data trains recorded on the optical disk 1, numeral 4 denotes a reproduced signal detector for detecting and converting the reproduced signal a outputted from the optical pickup 2 into a binary signal, numeral 7 denotes a spindle motor for rotationally driving the optical disk 1 mounted on the spindle motor 7, and numeral 8 denotes a spindle driver circuit for driving the spindle motor 7 under the control of a disk rotation controller 15 which will be described in detail later on. Further, reference numeral 9 denotes a synchronous clock generator which is comprised of a phase comparator 11a, a loop filter 12 and a voltage-controlled oscillator (VCO) 10, as will be described hereinafter. The disk rotation controller 15 is composed of a phase comparator 11b, a frame detector 19, a second reference oscillator 20, a first reference oscillator 21 and a maximum time duration detector 22, as will be described in detail hereinafter. Furthermore, reference numeral 16 denotes a signal processor which serves for writing or storing the data train (or series of data) read out from the optical disk in a memory, demodulating the data train and preforming an error correction/concealment processing for the data before sending it to an external circuit or apparatus.

The voltage-controlled oscillator 10 is designed to change the oscillation frequency of the clock signal outputted therefrom in dependence on an input voltage applied to the oscillator 10. In this conjunction, the voltage-controlled oscillator 10 is imparted with a wide frequency-variable range so that the data can be read out from the optical disk even when the optical disk is driven at a rotation speed outside of a specified rotation speed. The phase comparator 11a functions to compare the phase of the binary reproduced signal b with that of the clock signal outputted from the voltage-controlled oscillator 10 to thereby generate a phase difference signal. On the other hand, the loop filter 12 serves for eliminating high-frequency noise components from the phase difference signal outputted from the phase comparator 11a. Thus, the response characteristics of the synchronous clock generator 9 are essentially determined by the loop filter 12.

Referring again to FIG. 10, the phase comparator 11b serves for detecting a phase difference between the output signal of the frame detector 19 and that of a second reference oscillator 20. The frame detector 19 in turn serves for detecting a frame-synchro-nous signal on the basis of the synchronous clock signal derived from the binary reproduced signal. The second reference oscillator 20 operates to output a second reference clock signal, while the first reference oscillator 21 is designed to output a first clock signal. The maximum time duration detector 22 is so implemented as to detect a maximum time duration of bit pattern from the binary reproduced signal b.

Now, description will turn to operation of the conventional optical disk drive apparatus of the structure described above. The data trains recorded on the optical disk 1 are read out by the optical pickup 2. In that case, the servo controller 3 controls the optical pickup 2 such that the optical pickup 2 follows the data trains to be picked up independent of fluctuations and/or eccentricity of the plane of the optical disk 1. The reproduced signal detector 4 serves for digitizing the reproduced signal a read out from the optical disk 1 by the optical pickup 2 (i.e., conversion of the output signal of the optical pickup 2 into a binary signal). For convenience's sake of description, the binary signal outputted from the reproduced signal detector 4 is referred to also as the binary reproduced signal.

The maximum time duration detector 22 detects the maximum time duration (corresponding to an elevenchannel clock length in the case of the CD-ROM) of the bit pattern from the binary reproduced signal b to compare the detected duration with a number of counts (hereinafter also referred to as the count number) by counting the output clock pulses of the first reference oscillator 21. At this juncture, it should be mentioned that the maximum time duration mentioned above corresponds to the linear velocity of the optical disk in the reproducing operation mode. In dependence on the result of the comparison mentioned above, the maximum time duration detector 22 outputs a rotation control signal c such that the rotation speed of the spindle motor 7 is increased when the maximum time duration is short in the relative sense while lowering the rotation speed of the spindle motor 7 when the maximum time duration is long. The spindle driver circuit 8 drives the spindle motor 7 in conformance with the rotation control signal c outputted from the maximum time duration detector 22. In that case, the rotation speed of the spindle motor 7 is accelerated, being controlled roughly, without resorting to the servo-control. This acceleration phase is continued up to a time point at which the output of the synchronous clock generator 9 reaches a range in which the binary reproduced signal b can be pulled into synchronization.

The synchronous clock generator 9 is generally known as the phase-locked loop circuit (PLL circuit) and implemented in such structure as mentioned below. Namely, as shown in a broken-like block in FIG. 10, the synchronous clock generator 9 is constituted by the phase comparator 11a for comparing the phase of the binary signal with the output of the voltage-controlled oscillator 10 to thereby output the phase difference signal, the loop filter 12 for eliminating the high-frequency noise components from the phase difference signal, which thus determines the response characteristics of the phase-locked loop circuit 9, and the voltage-controlled oscillator 10 whose output clock oscillation frequency changes in dependence on the output voltage of the loop filter 12. The phase-locked loop circuit (i.e., the synchronous clock generator 9) generates the synchronous clock signal for the reproduction of data. In succession to the rough rotation control, the synchronous clock generator 9 pulls the binary reproduced signal b into synchronization, whereby the synchronous clock signal is generated.

Recorded on the optical disk 1 are the data trains, which are also referred to as the frames, on a block-by-block basis, wherein a pair of patterns having the maximum time duration and referred to as the frame-synchronous signal are recorded at a leading portion of the frame. The rotation control of the optical disk 1 (or the control of the spindle motor 7) after establishment of synchronization with the synchronous clock generator 9 is so performed that the interval of the frame-synchronous signal for detection of the rotation speed remains constant by making use of the frame-synchronous signal for detecting the rotation speed. Owing to the control described above, the optical disk 1 can be so controlled that the linear velocity thereof is maintained to be constant with high accuracy.

Next, description will be directed to the detail of the rotation control based on the frame-synchronous signal. The frame detector 19 detects the frame-synchronous signal on the basis of the synchronous clock derived from the binary reproduced signal b. Since the frame-synchronous signal is generated at a periodic rate corresponding to the linear velocity in the reproduction mode, it is possible to control the spindle motor 7 so that the frame-synchronous signal remains constant by detecting the phase difference between the frame-synchronous signal and the output clock of the second reference oscillator 20. In this manner, the data on the optical disk 1 are read out while controlling the linear velocity of the optical disk 1.

By the way, in order to read out a given train of data from the optical disk 1, it is required to move the optical pickup 2 at a high speed to the destination address, i.e., a location where the given data is recorded. Operation of moving the optical pickup to the destination address is referred to as the seeking or seek operation. In order to realize the seek operation at a high speed, it is preferred to perform the seek operation at a high speed in the radial direction of the optical disk 1 by traversing the record tracks instead of moving the optical pickup 2 along the circular track on the optical disk 1 for seeking the destination address. Parenthetically, the operation for causing the optical pickup 2 to move to the destination address in the circumferential direction for reading out the data or addresses sequentially will hereinafter be referred to as the sequential read operation. When the radial seek operation of the optical pickup 2 is performed, the optical pickup 2 is caused to move to a track located in the vicinity of the destination address while counting the number of tracks traversed by the optical pickup 2 because the optical disk 1 is incapable of reading the data from the optical disk 1 in the course of radially traversing the tracks.

For the convenience's sake of description, the track traversing operation for moving the optical pickup 2 to the location in the vicinity of the destination address will hereinafter be referred to as the track jump operation or simply as the track jump. In succession to the track jump, the address at which the optical pickup 2 has reached is checked or confirmed, whereupon the track jump operation is repeated in dependence on the number of tracks remaining to be traversed by the pickup for reaching the destination address or alternatively the optical pickup 2 is moved to the location of the destination address by performing the sequential read operation. Through the procedure mentioned above, it is possible to make access to the given or desired data for reading out the same.

For realizing the track jump, it is required to make available in precedence the information concerning the number of tracks over which the optical pickup 2 has to jump. In order to obtain such track number information, it is necessary to know the current address of the optical pickup 2, the destination address and the linear velocity of the optical disk 1. In this junction, the current address and the destination address can be derived from the specifications data of the CD-ROM drive. Accordingly, what is important is to know or determine the linear velocity.

According to the standards imposed on the CD-ROM drive, it is recommended that the linear velocity of the optical disk 1 should fall within a range of 1.2 to 1.4 m/sec. Because of such permissible range for the linear velocity, it is naturally expected that the linear velocity adopted in the data recording operation becomes different from one to another optical disk. Such being the circumstances, when the linear velocity differing from that used for the recording of data is employed for reading out or reproducing the data from the optical disk 1, error will be involved in the arithmetic determination or calculation of the number of tracks to be jumped over in order that the optical pickup 2 reaches the destination address, as a result of which the optical pickup 2 is forced to try the track jump operation a number of times, which in turn makes it difficult or impossible for the optical pickup 2 to reach the destination address. For this reason, there arises the necessity of knowing beforehand the linear velocity of the optical disk 1 as precisely as possible.

Heretofore, several methods of knowing the linear velocity which differs from one to another optical disk have been proposed. According to one of such conventional methods, the CD-ROM drive is preset to a given linear velocity upon starting the operation of the CD-ROM drive, whereon difference between the number of tracks to be jumped over and the number of tracks actually jumped over is determined to thereby correct the preset linear velocity, while according to another method, a constant linear velocity is employed for a given optical disk.

However, the first mentioned method, i.e., the method of correcting the preset linear velocity with the difference between the number of tracks to be jumped over by the optical pickup 2 and the number of tracks actually jumped over suffers from shortcomings that a lot of time is taken for the linear velocity converges to a definite value or the linear velocity may undergo erroneous correction when the preset number of tracks is failed to be jumped over. In other words, the conventional linear velocity correcting method suffers a drawback that the linear velocity becomes different every time the linear velocity is corrected.

On the other hand, the method of adopting the constant linear velocity independent of the optical disks is disadvantageous in that for a given optical disk, a linear velocity differing from the real linear velocity of the given optical disk may be set. More specifically, when the linear velocity differing from the real linear velocity is set, the performance of the seek time is degraded in proportion to the magnitude of the difference or error, with the seek time increasing considerably, giving rise to a problem.

Such being the circumstances, there exists a great demand for an optical disk drive apparatus and a linear velocity calculating method capable of calculating the linear velocity with high accuracy so as to realize the track jump operation precisely.

SUMMARY OF THE INVENTION

In light of the state of the art described above, it is an object of the present invention to provide an optical disk drive apparatus in which the linear velocity can be determined with enhanced accuracy and high reliability.

Another object of the present invention is to provide a linear velocity calculating method which can arithmetically determine or calculate the linear velocity with high accuracy.

In view of the above and other objects which will become apparent as the description proceeds, there is provided according to an aspect of the present invention an optical disk drive apparatus for reproducing data from an optical disk at a constant linear velocity, which apparatus includes a specified rotation speed detecting means for detecting or deciding whether or not the optical disk is rotating at a specified rotation speed, and a linear velocity calculating means for arithmetically determining or calculating the linear velocity by measuring a time taken for one complete rotation of the optical disk at a start position of a data area on the optical disk when it is decided by the specified rotation speed detecting means that the optical disk is rotating at a specified rotation speed.

According to another aspect of the present invention, there is proposed a linear velocity calculating method for calculating the linear velocity by measuring the time taken for one complete rotation of the optical disk at a start position of a data area on the optical disk when it is rotating at a specified rotation speed.

Thus, the present invention provides an optical disk drive apparatus and a linear velocity calculating method capable of calculating the linear velocity of he optical disk with high accuracy and enhanced relibility.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
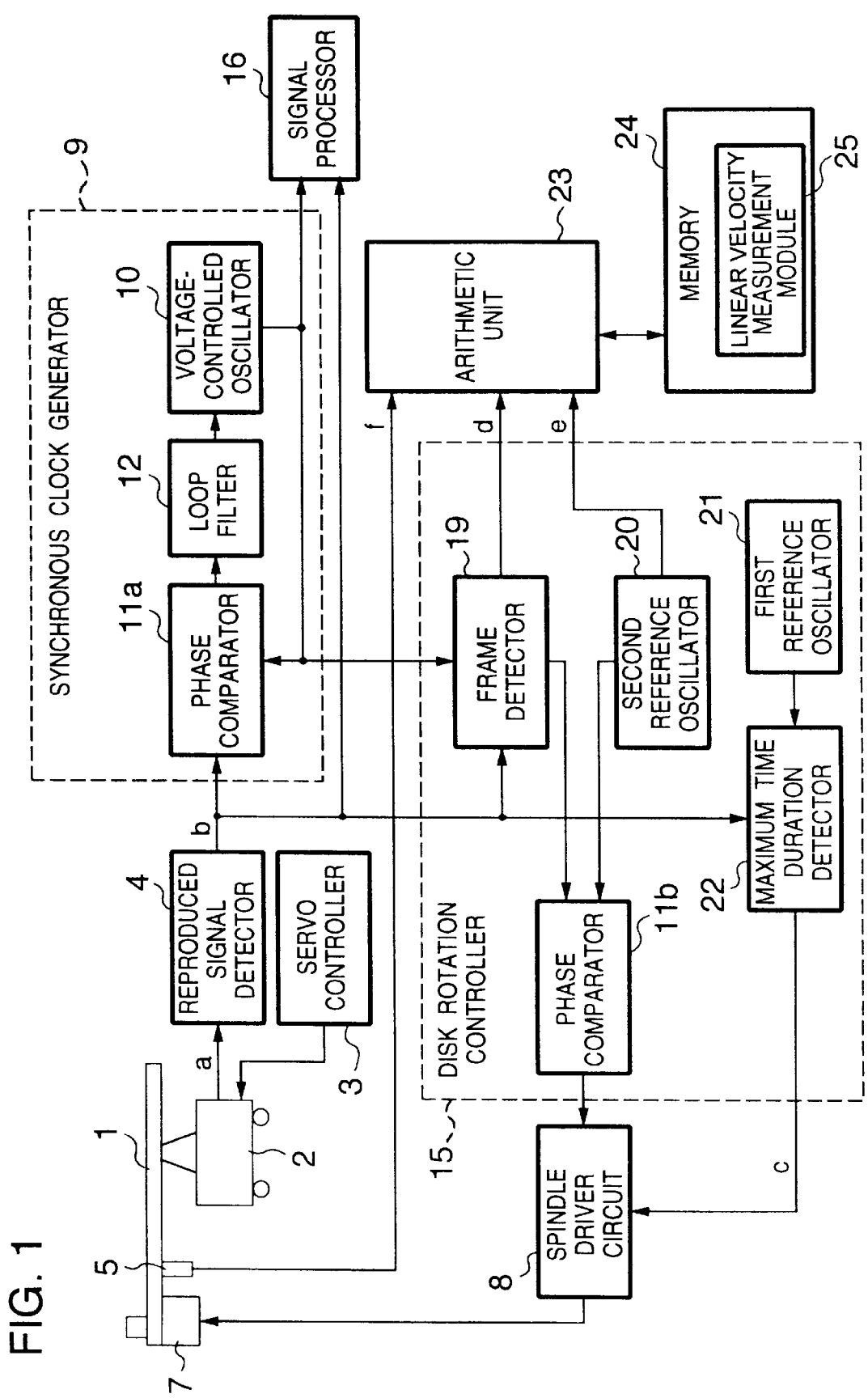
FIG. 1 is a block diagram showing a general arrangement of an optical disk drive apparatus according to a first embodiment of the present invention.

Now, the present invention will be described in detail in conjunction with what is presently considered as preferred or typical embodiments thereof by reference to FIGS. 1 to 9 of the accompanying drawings. In the following description, like reference characters designate like or corresponding parts throughout the several views.

EMBODIMENT 1

FIG. 1 is a block diagram showing a general arrangement of the optical disk drive apparatus according to a first embodiment of the present invention. In the figure, an optical disk 1, an optical pickup 2, a servo controller 3, a reproduced signal detector 4, a spindle motor 7, a spindle driver circuit 8, a synchronous clock generator 9, a voltage-controlled oscillator 10, phase comparators 11a and 11b, a loop filter 12, a disk rotation controller 15, a signal processor 16, a frame detector 19, a second reference oscillator 20, a first reference oscillator 21 and a maximum time duration detector 22 are similar or equivalent to those of the conventional optical disk drive apparatus described hereinbefore by using like reference characters. Accordingly, repeated description of these components will be unnecessary.

Referring to FIG. 1, reference numeral 5 denotes a spindle encoder for generating an analogue rotation speed signal in conformance with the rotation speed (rpm) of the spindle motor 7, numeral 23 denotes an arithmetic unit which has inputs applied with the frame-synchronous signal generated by the frame detector 19 and the reference clock signal generated by the second reference oscillator 20, and reference numeral 24 denotes a memory which incorporates therein a linear velocity measurement module 25. The arithmetic unit 23 serves for realizing the function of the linear velocity measurement module 25. To this end, the arithmetic unit 23 may be constituted by a central processing unit or CPU.

Figure 2:
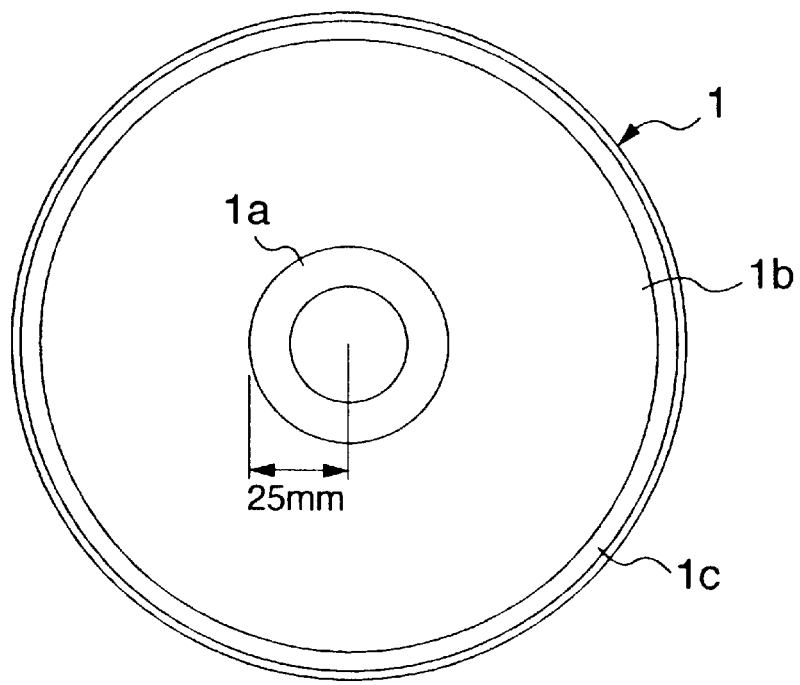
FIG. 2 is a diagram for illustrating schematically a structure of an optical disk employed in the apparatus shown in FIG. 1.

FIG. 2 is a diagram for illustrating scheatically a structure of the optical disk 1 employed in he optical disk drive apparatus shown in FIG. 1. Referring to FIG. 2, reference character 1a designates a read-in area for recording table-of-contents data indicating the contents of data recorded on the optical disk 1, respectively, reference character 1b designates a data area for recording the data, and reference character 1c designates a read-out area which indicates or marks that any further data is not recorded. In the case of the optical disk shown in FIG. 2, it is assumed that bit data are recorded spirally in the direction from the inner periphery to the outer periphery of the optical disk 1. The data to be recorded are divided into three areas 1a, 1b and 1c. The data recorded in the read-in area 1a, the data area 1b and the read-out area 1c contain information indicating that they are data recorded in these areas, respectively. Accordingly, by reading out the information, it can discriminatively be decided in which of the read-in area 1a, the data area 1b or the read-out area 1c the data reproduced by the optical pickup 2 originates.

Figure 3:
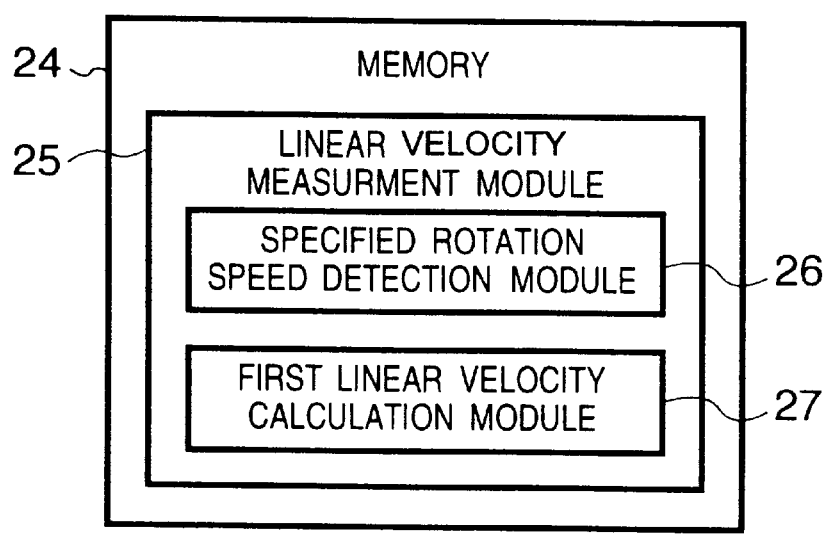
FIG. 3 is a diagram showing schematically a structure of a linear velocity measuring module according to the first embodiment of the invention.

FIG. 3 is a diagram showing schematically a structure of the linear velocity measurement module according to the first embodiment of the invention. As can be seen in the figure, the linear velocity measurement module 25 is composed of a specified rotation speed detection module 26 for making decision whether or not the spindle motor 7 is rotating at a specified rotation speed. The first linear velocity calculation module 27 calculates the linear velocity at a start position of the data area 1b shown in FIG. 2.

Now, description will be directed to operation of the optical disk drive apparatus of the structure described above by reference to flow charts shown in FIGS. 4 and 5, in which FIG. 4 shows a flow chart for illustrating operation of the specified rotation speed detection module 26 shown in FIG. 3, and FIG. 5 is a flow chart for illustrating operation of the first linear velocity calculation module 27 shown in FIG. 3. At this juncture, it should be mentioned that the contents outputted from the specified rotation speed detection module 26 and the first linear velocity calculation module 27 incorporated in the memory 24 are read out to be supplied to the arithmetic unit 23 for realizing various functions which will be described hereinafter.

Figure 4:
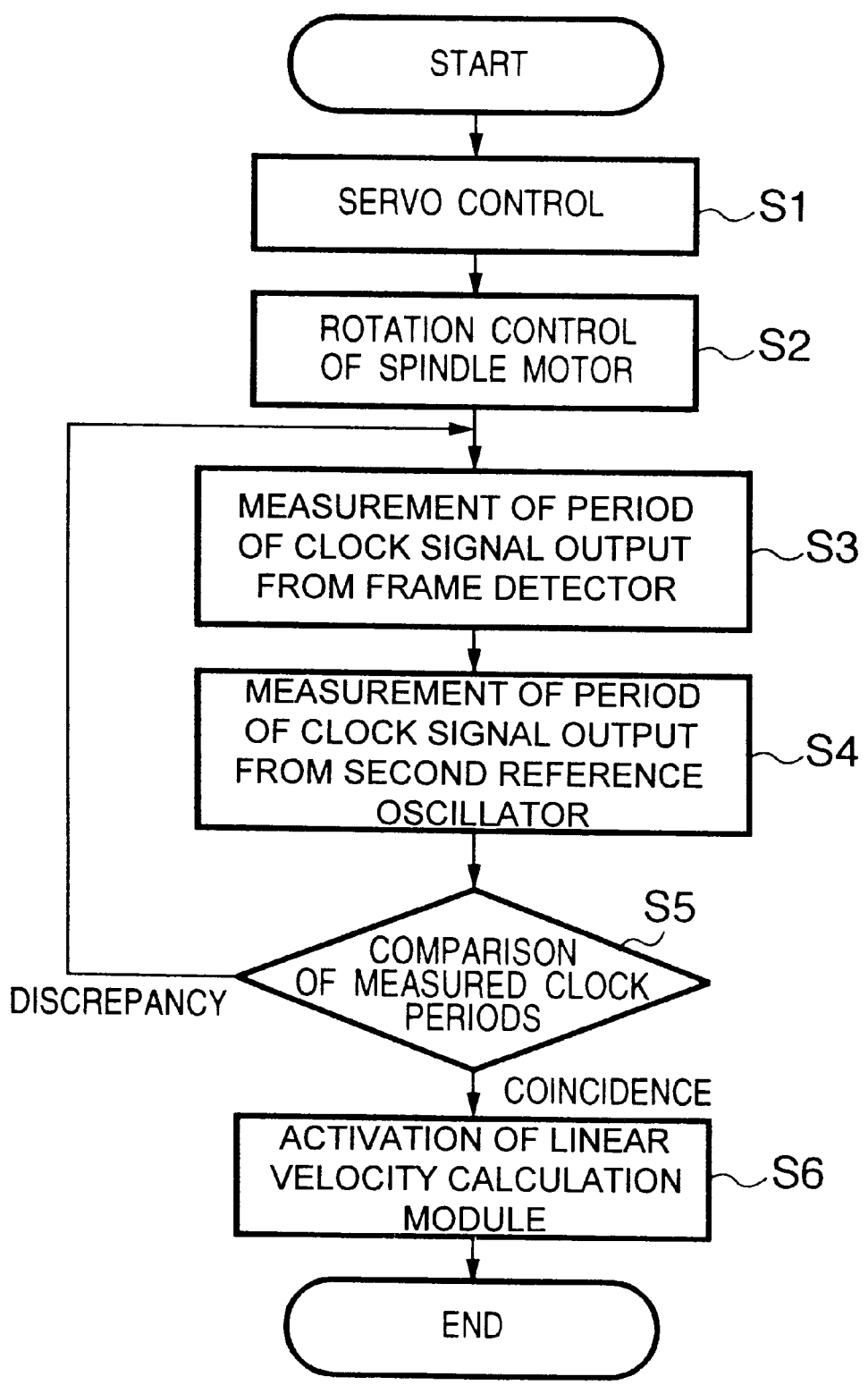
FIG. 4 is a flow chart for illustrating operations of a specified rotation speed detecting module shown in FIG. 3.

In the first place, operation of the specified rotation speed detection module 26 will be described by reference to FIG. 4. In this conjunction, it is however to be noted that in precedence to the operation of the specified rotation speed detection module 26, the rotation speed of the spindle motor 7 is accelerated to a sufficiently high level under the rough rotation speed control performed by the disk rotation controller 15 on the basis of the output signal of the maximum time duration detector 22 as described herein-before in conjunction with the prior art.

At first, the specified rotation speed detection module 26 cooperates with the servo controller 3 to set up the state in which the optical pickup 2 can follow the data trains recorded on the optical disk 1 (step S1). To this end, the spindle driver circuit 8 performs the rotation speed control of the spindle motor 7 on the basis of the output signal of the phase comparator 11b incorporated in the disk rotation controller 15. More specifically, the disk rotation controller 15 controls the rotation speed of the spindle motor 7 so that the interval at which the reproduced synchronous clock is generated by the synchronous clock generator 9 coincides with the interval of the frame-synchronous signal detected by the frame detector 19, whereby the rotation speed of the spindle motor 7 is accelerated to the specified rotation speed (step S2). So far as the steps S1 and S2 are concerned, the control processing is essentially same as that adopted in the conventional optical disk drive apparatus.

Next, it is confirmed or decided whether or not the spindle motor 7 rotates accurately at the specified rotation speed under the rotation control in the step S2. To this end, a clock period d of the frame-synchronous signal outputted from the frame detector 19 is arithmetically determined or measured by the arithmetic unit 23 in a step S3. At the same time, a reference clock period e outputted from the second reference oscillator 20 is determined arithmetically by the arithmetic unit 23 in a step S4.

In succession, the clock period d of the frame-synchronous signal is compared with the reference clock period e to thereby decide whether or not coincidence is found between both the clock periods d and e in a step S5. When coincidence is decided (i.e., when the decision step S5 results in "COINCIDENCE"), this means that the spindle motor 7 rotates precisely at the specified rotation speed. On the other hand, when the decision step S5 results in that the clock period d and the reference clock period e do not coincide with each other (i.e., when the decision step S5 results in "DISCREPANCY"), the step S3 is resumed, whereupon measurement of the clock period d and the reference clock period e as well as comparison therebetween is repeated (step S3 to step S5). When coincidence between the clock period d of the frame synchronous signal and the reference clock period e is detected in the step S5, i.e., after the rotation speed of the spindle motor 7 has attained precisely the specified rotation speed, the first linear velocity calculation module 27 is then activated in a step S6.

Figure 5:
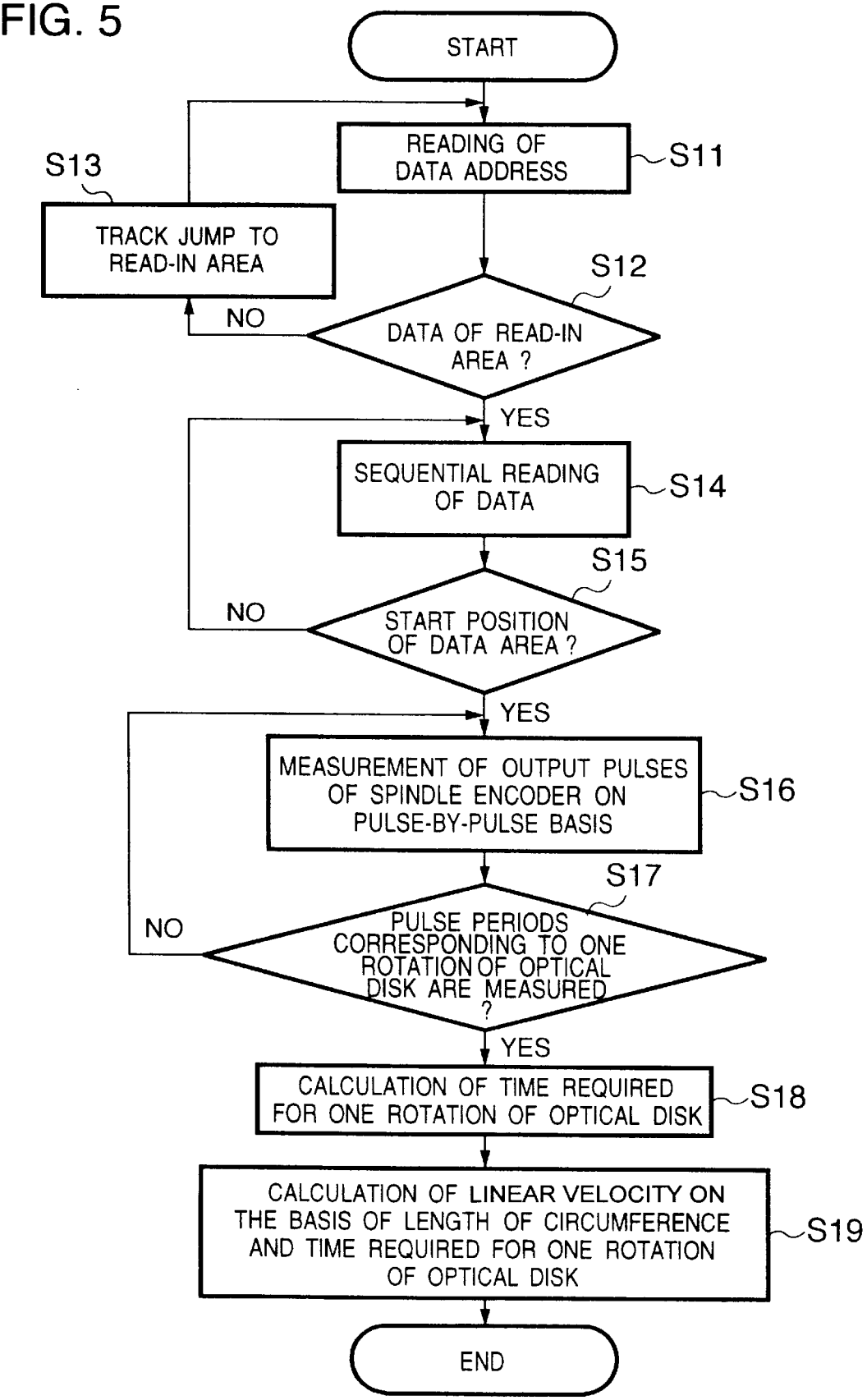
FIG. 5 is a flow chart for illustrating operations of a first linear velocity calculating module shown in FIG. 3.

Next, operation of the first linear velocity calculation module 27 will be described by reference to FIG. 5. Upon activation of the first linear velocity calculation module 27, the current position data (i.e., data address) of the optical pickup 2 is read by the optical pickup 2 itself in a step S11.

Subsequently, decision is made as to whether or not the current position data read by the optical pickup 2 belongs to the read-in area 1a (step S12). unless the current position data belongs to the read-in area 1a, the number of tracks intervening between the current position and the start position of the data area 1b (position of the absolute address "0") is calculated on the basis of the current position address and the destination address (absolute address "0"), whereupon the track jump is executed in the direction toward the inner periphery over a number of tracks which corresponds to the intervening track number added with several tracks (step S13), whereupon the data read operation is repeated again (steps S11 and S12). The purpose of addition of several tracks to the number of tracks intervening in reaching the start position of the data area 1b in the step 13 is to position the optical pickup 2 within the read-in area 1a without fail.

When the data belonging to the read-in area 1a is decided in the step S12, the data is read out sequentially (step S14), whereupon the sequential read operation is repetitively carried out until the optical pickup 2 is moved to the start position of the data area 1b 20 (steps S14 and S15).

When it is decided in the step S15 that the optical pickup 2 is moved to the start position of the data area 1b, then the period of the output pulses generated by a spindle encoder 5 is measured on a pulse-by-pulse basis (step S16). The spindle encoder 5 outputs the pulses substantially at a constant interval during one complete rotation of the spindle motor 7. In this conjunction, it is to be noted that the decision as to whether or not the spindle motor 7 and hence the optical disk 1 rotate completely can be made on the basis of the data address read by the optical pickup 2. When it is decided that the pulse periods corresponding to one rotation of the spindle motor 7 have not been measured yet, the step S16 is resumed (step S17), whereupon the measurement of the output pulse periods is repeated until the pulse periods corresponding to one rotation of the spindle motor 7 is detected (steps S16 and S17).

On the other hand, when it is decided in the step S17 that the pulse periods corresponding to one rotation of the spindle motor 7 are measured, all the output pulse periods are added together to thereby calculate a time T taken for one rotation of the spindle motor 7 (step S18). This time T will hereinafter be referred to as the one-rotation time.

Since the one-rotation time T is measured at the start position of the data area 1b, the linear velocity SV can be arithmetically determined or calculated on the basis of the one-rotation time T in accordance with the following expression (1) in the step S19:

$$SV(m/s) = 2\pi r/T \qquad (1)$$

where r represents a distance from the center of the optical disk 1 to the start position of the data area 1b. Parenthetically, the start position of the data area 1b is specifically determined in dependence on the types of the optical disk. In the case of the so-called CD, the distance between the center and the start position of the data area 1b is 25 mm.

As will now be understood from the foregoing description, by virtue of such arrangement of the optical disk drive apparatus according to the first embodiment of the invention that the one-rotation time T is measured at the start position of the data area 1b by determining the sum of the output pulse periods generated by the spindle encoder 5, whereon the linear velocity SV is arithmetically determined on the basis of the one-rotation time T and the radius r between the center of the optical disk and the start position of the data area 1b, it is possible to arithmetically determine the linear velocity of the optical disk 1 with high accuracy, whereby the track jump of the optical pickup 2 in the position seek operation can be realized with high precision.

EMBODIMENT 2

Figure 6:
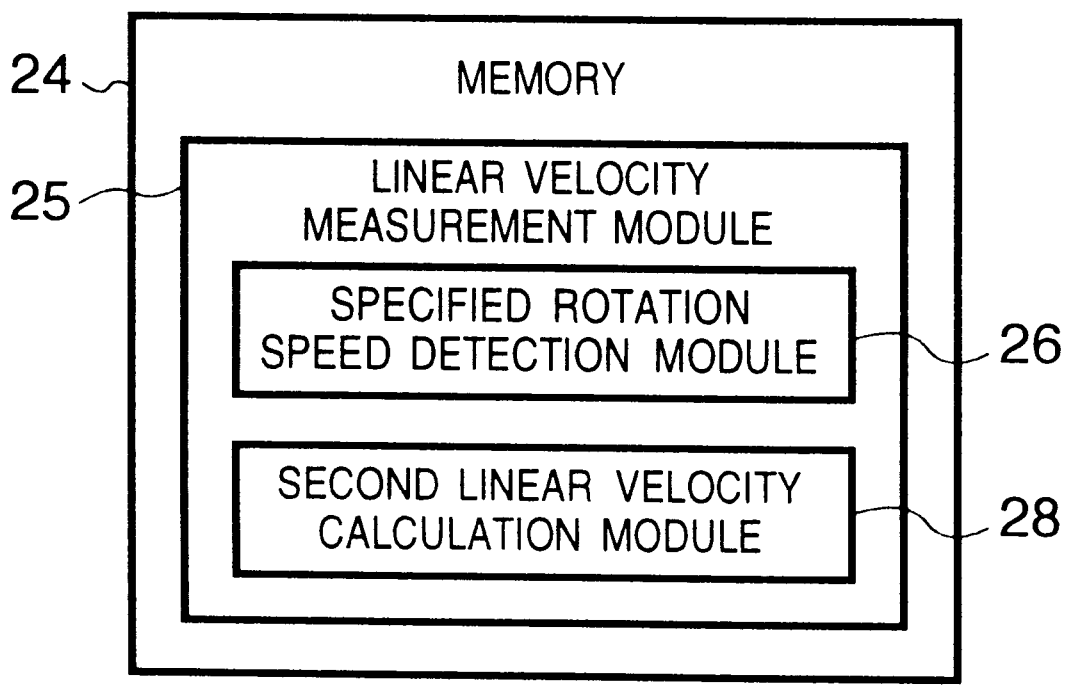
FIG. 6 is a schematic diagram showing a structure of a linear velocity measuring module of an optical disk drive apparatus according to a second embodiment of the present invention.

The optical disk drive apparatus according to a second embodiment of the present invention is implemented in a structure which is substantially the same as that of the first embodiment shown in FIG. 1. The optical disk drive apparatus according to the instant embodiment differs from the first embodiment in respect to the linear velocity measurement module 25. FIG. 6 is a schematic diagram showing a structure of a linear velocity measurement module 25 according to the second embodiment of the invention. In FIG. 6, the specified rotation speed detection module 26 is essentially the same as that described hereinbefore in conjunction with the first embodiment shown in FIG. 3. Accordingly, like reference numerals are used for indicating similar components and repetitive description thereof is omitted. The linear velocity measurement module 25 according to the instant embodiment of the invention includes a second linear velocity calculation module 28 for arithmetically determining the linear velocity at the start position of the data area 1b.

Now, operation of the optical disk drive apparatus of the structure mentioned above will be described. The operation of the specified rotation speed detection module 26 is essentially same as in the case of the first embodiment and thus repeated description thereof will be unnecessary. In this conjunction, it should however be mentioned that in precedence to the detecting operation of the specified rotation speed detection module 26, the rotation speed of the spindle motor 7 is accelerated to a sufficiently high level under the rough rotation speed control performed by the disk rotation controller 15 on the basis of the output signal of the maximum time duration detector 22 as described hereinbefore in connection with the prior art.

Figure 7:
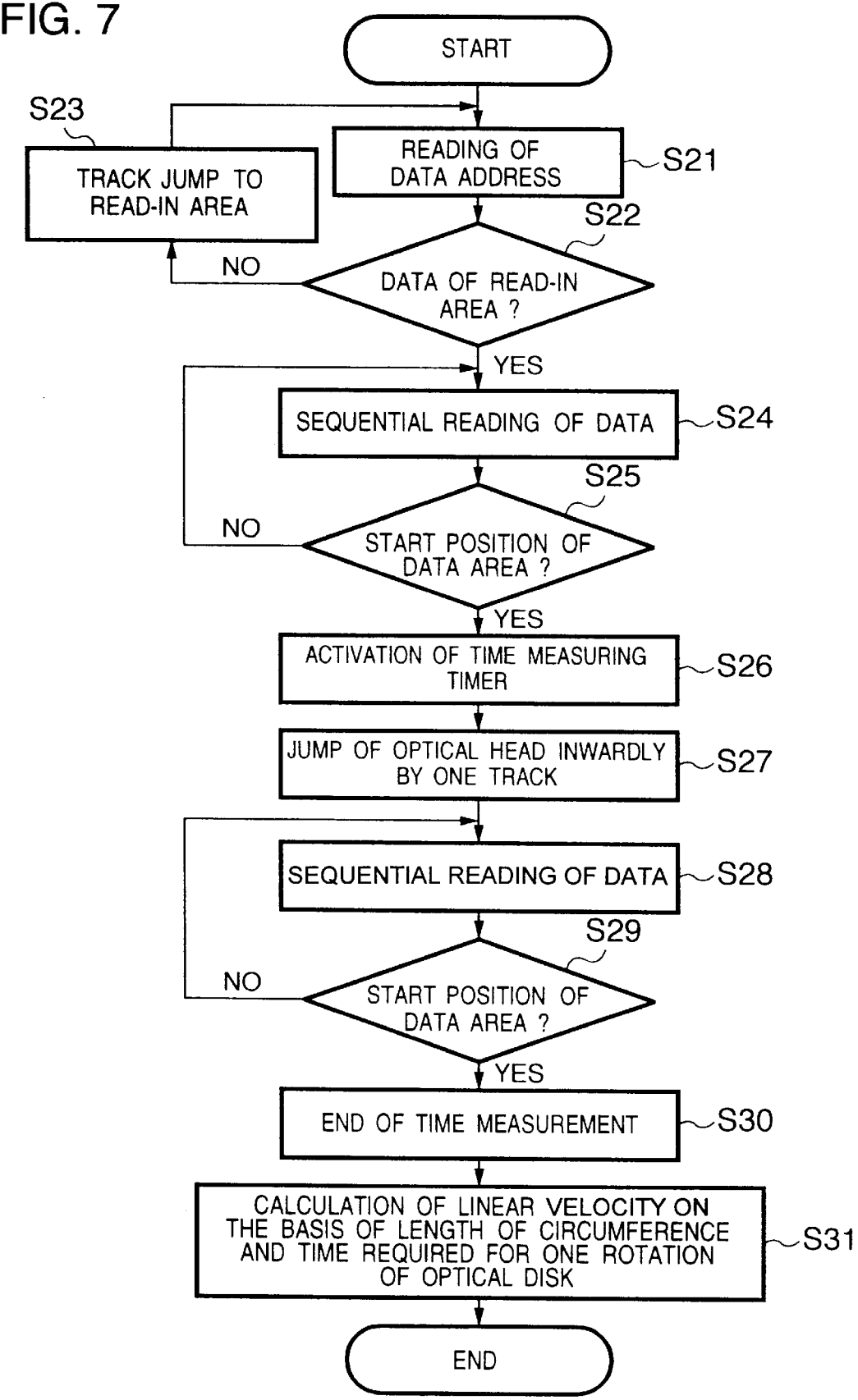
FIG. 7 is a flow chart for illustrating operation of the second linear velocity calculation module shown in FIG. 6.

Next, operation of the second linear velocity calculation module 28 will be described by reference to FIGS. 2 and 7. FIG. 7 is a flow chart for illustrating operation of the second linear velocity calculation module 28 shown in FIG. 6. Upon activation of the second linear velocity calculation module 28, the current position data (i.e., data address) of the optical pickup 2 is read by the optical pickup 2 itself in a step S21.

Subsequently, decision is made as to whether or not the current position data read by the optical pickup 2 belongs to the read-in area 1a shown in FIG. 2 (step S22). Unless the current position data belongs to the read-in area 1a, the number of tracks intervening between the current position and the start position of the data area 1b (position of the absolute address "0") is calculated on the basis of the current position address and the destination address (absolute address "0"), whereupon the track jump is executed in the direction toward the inner periphery over a number of tracks which corresponds to the number of the intervening tracks added with several tracks (step S23), whereupon the data read operation is again performed (steps S21 and S22). The purpose of addition of several tracks to the number of tracks intervening in reaching the start position of the data area 1b in the step 23 is to position the optical pickup 2 within the read-in area 1a without fail.

When the data belonging to the read-in area 1a is decided in the step S22, the data is read out sequentially (step S24), whereupon the sequential read operation is repetitively carried out until the optical pickup is moved to the start position of the data area 1b (steps S24 and S25).

When it is decided in the step S25 that the optical pickup 2 is moved to the start position of the data area 1b, then a timer for time measurement (not shown) is activated (step S26).

Subsequently, the optical pickup 2 is caused to jump by one track in the direction toward the inner periphery of the optical disk 1 (step S27), whereon sequential data read operation is performed by the optical pickup 2 (step S28). Such sequential read operation is continued until the optical pickup 2 is moved to the start position of the data area 1b (i.e., until the optical pickup 2 resumes the position immediately preceding to the one-track jump operation). See steps S28 and S29 in FIG. 7. When the optical pickup 2 reaches the start position of the data area 1b, this means that the sequential read operation is carried out along one track over the whole length thereof (corresponding to one complete rotation of the optical disk).

When it is decided in the step S29 that the optical pickup 2 is moved to the start position of the data area 1b, the time measurement by the timer comes to an end (step S30).

The time duration measured by the timer represents the time T required for one complete rotation of the optical disk. Accordingly, the linear velocity SV can be arithmetically determined or calculated in a step S31 in accordance with the expression (1) mentioned previously in conjunction with the first embodiment of the invention. Namely, $$SV(m/s) = 2\pi r/T \qquad (1)$$

where r represents a distance from the center of the optical disk 1 to the start position of the data area 1b. In the case of the CD, the above distance is 25 mm, as mentioned hereinbefore in conjunction with the first embodiment of the invention.

As is apparent from the foregoing description, by virtue of such arrangement of the optical disk drive apparatus according to the second embodiment of the invention that the one-rotation time T of the optical pickup 2 is measured at the start position of the data area 1b by the timer, whereon the linear velocity SV is arithmetically determined on the basis of the one-rotation time T and the radius r between the center of the optical disk and the start position of the data area 1b, the spindle encoder 5 can be spared. Thus, the optical disk drive apparatus according to the second embodiment of the invention can be implemented inexpensively in a simplified structure. Nevertheless, it is possible to arithmetically determine the linear velocity with high accuracy, whereby the track jump of the optical pickup 2 in the position seek operation can be realized with high precision.

EMBODIMENT 3

Figure 8:
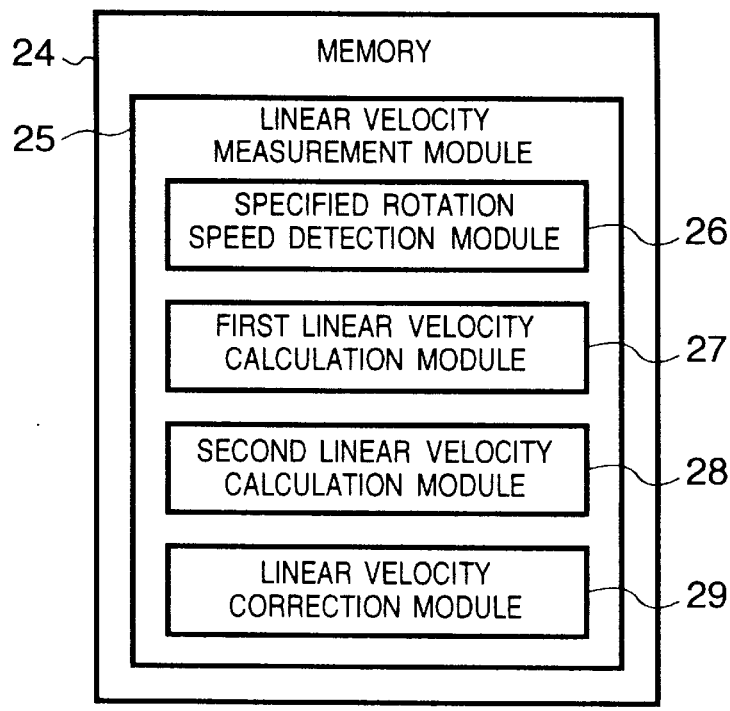
FIG. 8 is a schematic diagram showing a structure of a linear velocity measuring module of an optical disk drive apparatus according to a third embodiment of the invention.

The optical disk drive apparatus according to a third embodiment of the present invention is implemented in a structure which is substantially the same as that of the first embodiment shown in FIG. 1. The optical disk drive apparatus according to the instant embodiment differs from the first embodiment in respect to the linear velocity measurement module 25. FIG. 8 is a schematic diagram showing a structure of a linear velocity measurement module 25 constituting a part of the optical disk drive apparatus according to the third embodiment of the invention. In FIG. 8, the specified rotation speed detection module 26 and the first linear velocity calculation module 27 are essentially the same as those described hereinbefore in conjunction with the first embodiment shown in FIG. 3 while the second linear velocity calculation module 28 is substantially the same as that shown in FIG. 6. Accordingly, repetitive description of these components will be unnecessary. In FIG. 8, reference numeral 29 denotes a linear velocity correction module for correcting the linear velocity determined by the first linear velocity calculation module 27 or the second linear velocity calculation module 28.

Operation of the optical disk drive apparatus of the structure mentioned above will be described. Operations of the specified rotation speed detection module 26 and the first linear velocity calculation module 27 are essentially same as in the case of the first embodiment. Further, operation of the second linear velocity calculation module 28 is essentially the same as that of the second embodiment. Thus, repeated description of these components is omitted. It should however be added that in precedence to the detecting operation of the specified rotation speed detection module 26, the rotation speed of the spindle motor 7 is accelerated to a sufficiently high level under the rough rotation speed control performed by the disk rotation controller 15 on the basis of the output signal of the maximum time duration detector 22 as described hereinbefore in connection with the prior art. Further, either the first linear velocity calculation module 27 or the second linear velocity calculation module 28 may be used for arithmetically determining the linear velocity.

Figure 9:
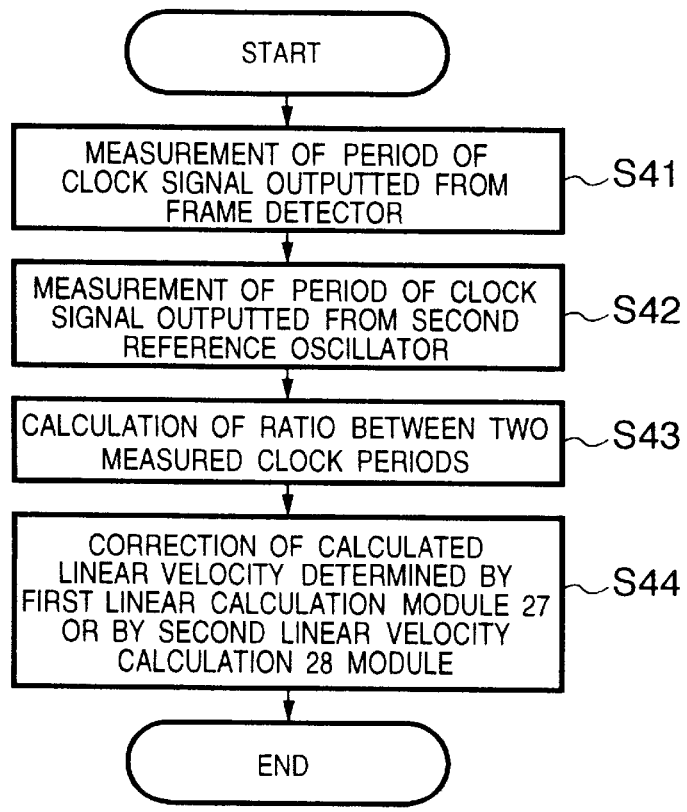
FIG. 9 is a flow chart for illustrating operation of a linear velocity correcting module shown in FIG. 8.
Figure 10:
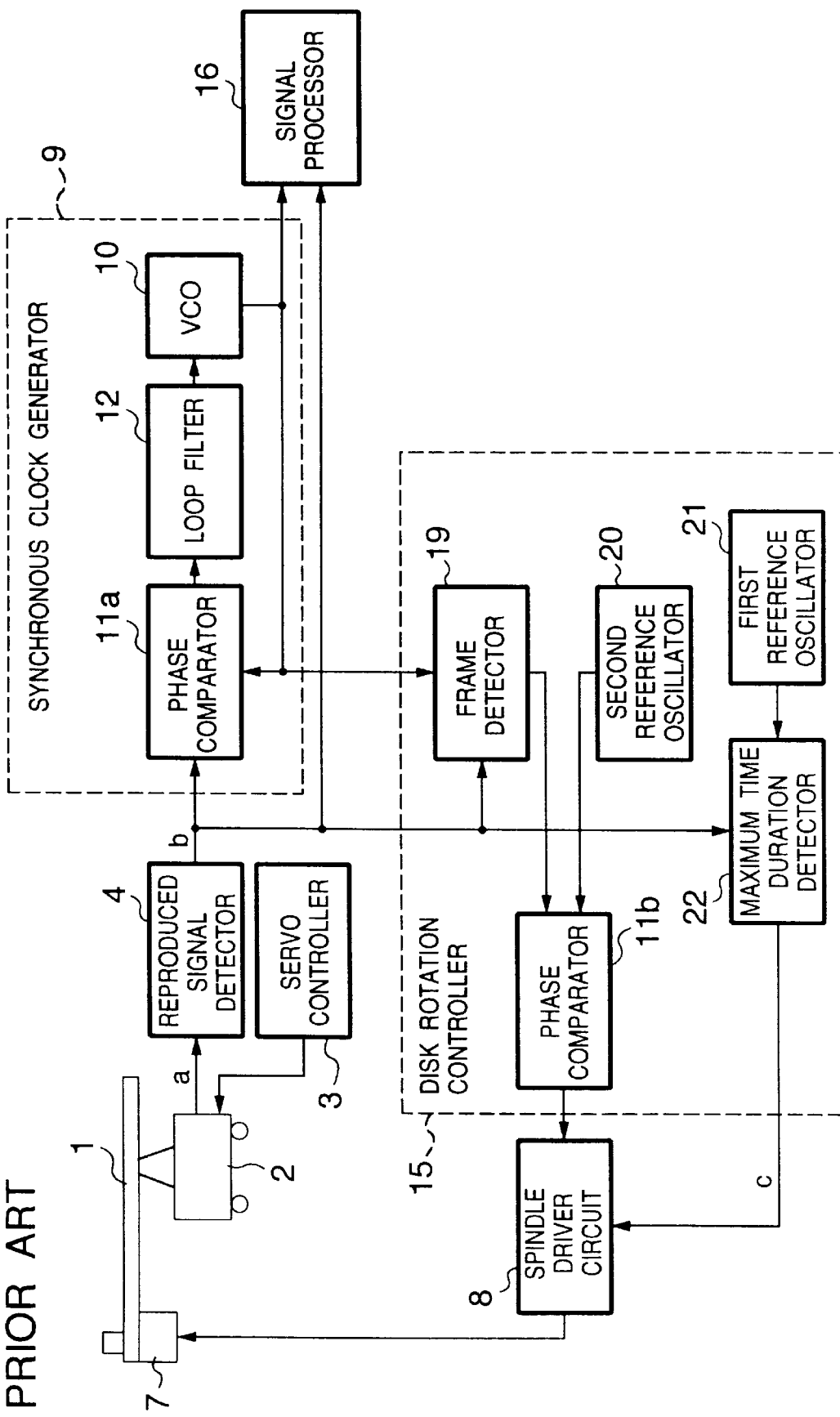
FIG. 10 is a block diagram showing schematically a structure of a conventional optical disk drive.

Next, operation of the linear velocity correction module 29 will be described by reference to FIG. 9 which shows a flow chart for illustrating operation of the linear velocity correction module 29 shown in FIG. 8. At first, the period of the clock d outputted from the frame detector 19 is determined or measured by the arithmetic unit 23 in a step S41. At the same time, the period of the clock e outputted from the second reference oscillator 20 is also measured by means of the arithmetic unit 23 in a step S42.

Subsequently, a ratio (clock period ratio) R of the period SCLK of the clock e generated by the second reference oscillator 20 to the period FCLK of the clock d derived from the output of the frame detector 19 is arithmetically determined in a step S43 in accordance with the following expression (2):

$$R = FCLK/SCLK \quad (2)$$

When the clock period ratio R is smaller than one, this means that the optical disk 1 is rotating at a higher speed than the specified rotation speed. According to the concept of the invention incarnated in the instant embodiment, the linear velocity is corrected by taking advantage of this fact.

More specifically, in a step S44, the linear velocity is corrected by using the clock period ratio R determined in the step S43 in accordance with the following expression (3):

$$SVH = SV/R \quad (3)$$

where SVH represents the corrected linear velocity, and SV represents the linear velocity determined by the first linear velocity calculation module 27 or the second linear velocity calculation module 28.

As will be understood from the above, with such arrangement of the optical disk drive apparatus according to the instant embodiment of the invention that the corrected linear velocity SVH is determined on the basis of the clock period ratio R and the linear velocity SV calculated, the linear velocity of the optical disk 1 can be calculated with extremely high accuracy, whereby the track jump of the optical pickup 2 in the position seek operation can be realized with further enhanced accuracy.

As is apparent from the foregoing description, the optical disk drive apparatus provided by the invention has a feature that the linear velocity is arithmetically determined by measuring the time taken for a full rotation of the optical disk at the start position of the data area the radius position of which is definitely known. Thus, the track jump in the position seek operation can be performed with high accuracy on the basis of the linear velocity determined precisely, to an advantageous effect.

Furthermore, owing to the structure of the optical disk drive apparatus which is equipped with the spindle encoder, the linear velocity can be calculated with high accuracy by measuring the time period taken for a complete rotation of the optical disk on the basis of the output pulses of the spindle encoder, whereby the track jump in the position seek operation can be realized with high precision, to another advantageous effect.

Additionally, with the structure of the optical disk drive apparatus in which the timer is employed as the time measuring means, the linear velocity can be calculated with high precision by measuring the time taken for the sequential read operation along one track corresponding to a full rotation of the optical disk. Thus, the track jump in the position seek operation can be realized with high precision, to another advantageous effect.

According to a further feature of the invention, the linear velocity is corrected with the clock period ratio of the clock period generated by the reference oscillator to the clock period of the frame-synchro-nous signal, whereon the corrected linear velocity is arithmetically determined by dividing the value of the linear velocity outputted from the linear velocity calculation module by the clock period ratio. In this way, the linear velocity calculated by the linear velocity calculation module can be corrected for determining the linear velocity with further improved accuracy. Thus, the track jump in the position seek operation can be realized with higher precision, to another advantageous effect.

As will now be understood, by virtue of the linear velocity calculation method in the optical disk drive apparatus according to the invention, the linear velocity can be arithmetically determined by measuring the time taken for a full rotation of the optical disk at the start position of the data area whose position has already been known definitely as the radial position so that the track jump in the position seek operation can be performed with high accuracy, to an advantageous effect.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described in conjunction with the optical disk destined only for reading or reproducing operation, it can be readily understood by those skilled in the art that the concept of the invention can equally find application to the optical disk drive apparatus designed for reading or writing data from or on an optical disk.

Accordingly, all suitable modifications and equivalents may be resorted to, falling within the spirit and scope of the invention.

What is claimed is:

1. A method of calculating a linear velocity for reproducing information from an optical disk at a constant linear velocity, comprising:
    an area reproduction step including reproducing a predetermined position on said optical disk;
    a rotation period measurement step including rotating said optical disk at a specified rotation speed to activate said area reproduction step to thereby measure a time taken for one rotation of said optical disk at said predetermined position;
    a linear velocity calculation step including arithmetically determining the linear velocity of the optical disk by dividing a circumference at said predetermined position by the time measured in said rotation period measurement step; and
    a period ratio calculation step including arithmetically determining a ratio between a period of a synchronous signal corresponding to a speed for reproduction of said information and a period of a clock signal serving as a reference signal,
    wherein said linear velocity is corrected by multiplying said linear velocity determined in said linear velocity calculation step by the ratio determined in said period ratio calculation step.

2. A linear velocity calculation method according to claim 1,
    further comprising:
        a rotation detection step including detecting rotation of said optical disk or a driving means for rotationally driving said optical disk,
        wherein in said rotation period measurement step, a time corresponding to one period of an output signal derived from said rotation detection step is measured.

3. A linear velocity calculation method according to claim 1,
    wherein in said rotation period measurement step, an optical pickup for reproducing information from the optical disk is first caused to jump by one track in a direction toward an inner periphery of said optical disk, and then a time taken for said optical pickup to move to an original position from which said optical pickup jumped while performing a sequential read operation on said optical disk is measured.

4. A method of calculating a linear velocity for reproducing information from an optical disk at a constant linear velocity, comprising:
    a specified rotation speed detection step including deciding whether or not said optical disk is rotating at a specified rotation speed;
    an area reproduction step including reproducing a predetermined position on said optical disk;
    a rotation period measurement step including activating said area reproduction step when rotation of said optical disk at the specified rotation speed is detected in said specified rotation speed detection step, to thereby measure a time taken for one rotation of said optical disk;
    a linear velocity calculation step including arithmetically determining the linear velocity by dividing a circumference at said predetermined position by the time measured in said rotation period measurement step;
    a period ratio calculation step including arithmetically determining a ratio between a period of a synchronous signal corresponding to a speed for reproduction of information and a period of a clock signal serving as a reference signal; and
    a linear velocity correction step including correcting said linear velocity by multiplying said linear velocity determined in said linear velocity calculation step by the ratio determined in said period ratio calculation step.

5. An optical disk drive apparatus comprising:
    optical disk drive means for driving rotationally an optical disk;
    optical pickup means for reproducing information from said optical disk, wherein reproduction of the information from said optical disk by said optical pickup means is performed by driving said optical disk at a constant linear velocity by said optical disk drive means;
    rotation period measurement means for rotating said optical disk at a specified rotation speed to measure a time taken for one rotation of said optical disk at a predetermined position of said optical disk;
    linear velocity calculation means for arithmetically determining the linear velocity by dividing a circumference at said predetermined position by the time measured in said rotation period measurement means; and
    period ratio calculation means for arithmetically determining a ratio between a period of a frame-synchronous signal corresponding to a speed for reproduction of said information and a period of a clock signal supplied from a reference oscillator,
    wherein said linear velocity is corrected by multiplying said linear velocity determined by said linear velocity calculation means by the ratio determined by said period ratio calculation means.

6. An optical disk drive apparatus according to claim 5, further comprising:
    rotation detection means for detecting rotation of said optical disk drive means,
    wherein said rotation period measurement means measures a time corresponding to one period of an output signal supplied from said rotation detection means.

7. An optical disk drive apparatus according to claim 5, wherein said rotation period measurement means first causes said optical pickup means to jump by one track in a direction toward an inner periphery of said optical disk, and then measures a time taken for said optical pickup to move to an original position from which said optical pickup jumped while performing a sequential read operation on said optical disk.

8. An optical disk drive apparatus, comprising optical disk drive means for driving rotationally an optical disk, and optical pickup means for reproducing information from said optical disk, wherein reproduction of the information from said optical disk by said optical pickup means is performed by driving said optical disk at a constant linear velocity by said optical disk drive means, said apparatus further comprising:
- specified rotation speed detection means for deciding whether or not said optical disk is rotating at a specified rotation speed;
- rotation period measurement means for measuring a time taken for one rotation of said optical disk at a predetermined position on said optical disk when rotation of said optical disk at the specified rotation speed is detected by said specified rotation speed detection means;
- period ratio calculation means for arithmetically determining a ratio between a period of a frame-synchronous signal corresponding to a speed for the reproduction of the information and a period of a clock signal supplied from a reference oscillator;
- linear velocity calculation means for arithmetically determining the linear velocity by dividing a circumference at said predetermined position by the time measured by said rotation period measurement means; and
- linear velocity correcting means for correcting said linear velocity by multiplying said linear velocity determined by said linear velocity calculation means by the ratio determined by said period ratio calculation means.

9. An optical disk drive apparatus according to claim 8, wherein:
said predetermined position on said optical disk is a start position of a data area on said optical disk.

10. An optical disk drive apparatus, comprising optical disk drive means for driving rotationally an optical disk, and optical pickup means for reproducing information from said optical disk, wherein reproduction of the information from said optical disk by said optical pickup means is performed by driving said optical disk at a constant linear velocity by said optical disk drive means, said apparatus further comprising:
- specified rotation speed detection means for deciding whether or not said optical disk is rotating at a specified rotation speed;
- rotation period measurement means for measuring a time taken for one rotation of said optical disk at a predetermined position on said optical disk when rotation of said optical disk at the specified rotation speed is detected by said specified rotation speed detection means;
- period ratio calculation means for arithmetically determining a ratio between a period of a frame-synchronous signal corresponding to a speed for the reproduction of the information and a period of a clock signal supplied from a reference oscillator;
- linear velocity calculation means for arithmetically determining the linear velocity by dividing a circumference at a start position of a data area of said optical disk by the time measured by said rotation period measurement means; and
- linear velocity correcting means for correcting said linear velocity by multiplying said linear velocity determined by said linear velocity calculation means by the ratio determined by said period ratio calculation means.

* * * * *